United States Patent
Maughan

[11] Patent Number: 6,152,637
[45] Date of Patent: Nov. 28, 2000

[54] INDEPENDENT WEAR INDICATOR ASSEMBLY FOR VEHICULAR STEERING KNUCKLES BALL & SOCKET JOINTS AND OTHER SIMILAR DEVICES

[75] Inventor: Garth B. Maughan, Delta, Ohio

[73] Assignee: Dana Corporation, Toledo, Ohio

[21] Appl. No.: 09/067,368

[22] Filed: Apr. 27, 1998

[51] Int. Cl.[7] ................................................. F16C 11/00
[52] U.S. Cl. ............................................. 403/27; 403/135
[58] Field of Search ............................... 403/27, 22, 132, 403/133, 135, 137, 138, 140; 384/206, 209, 213

[56] References Cited

U.S. PATENT DOCUMENTS

| | | |
|---|---|---|
| 3,791,748 | 2/1974 | Goodrich, Jr. et al. ................ 403/27 |
| 3,813,178 | 5/1974 | Herbenar et al. . |
| 3,845,735 | 11/1974 | Bossler, Jr. . |
| 3,850,443 | 11/1974 | Hassan . |
| 4,017,197 | 4/1977 | Farrant . |
| 4,070,121 | 1/1978 | Graham . |
| 4,358,211 | 11/1982 | Goodrich, Jr. et al. . |
| 4,576,499 | 3/1986 | Smith . |
| 4,626,121 | 12/1986 | Tajima et al. ............................ 403/27 |
| 4,749,299 | 6/1988 | Swanson . |
| 5,564,853 | 10/1996 | Mauhgan ................................ 403/137 |

Primary Examiner—Lynne H. Browne
Assistant Examiner—John R. Cottingham
Attorney, Agent, or Firm—Rader, Fishman & Grauer PLLC

[57] ABSTRACT

A joint assembly is provided having a first bearing member engaging a second bearing member and having a sealing washer that is located adjacent to the second bearing member. A wear indicator insert is sandwiched in between the second bearing member and the sealing washer in a pre-compressed condition. The indicator insert includes a head that extends beyond the sealing washer until a certain amount of bearing wear is present in the joint assembly. In addition, the indicator insert cannot be wiggled until a certain degree of wear has occurred in the joint assembly.

14 Claims, 1 Drawing Sheet

INDEPENDENT WEAR INDICATOR ASSEMBLY FOR VEHICULAR STEERING KNUCKLES BALL & SOCKET JOINTS AND OTHER SIMILAR DEVICES

FIELD OF THE INVENTION

The present invention relates to a wear indicator for articulating joint assemblies and, in particular, to vehicle steering knuckles and ball and socket joints that have devices for indicating a degree of wear in the joints to facilitate maintenance inspections.

BACKGROUND OF THE INVENTION

Articulating joints are applicable to a wide range of applications, including steering linkages for automotive vehicles. Examples of typical joints found in steering linkages are ball and socket joints and steering knuckles. It is known to provide wear indicators in these types of joints to show the amount of bearing wear present in the joint assembly. Bearing wear is translated from the degree of joint looseness.

One type of known ball and socket joint has a wear indicator associated with a bearing that engages a stud ball of the joint. However, both the bearing and the wear indicator are biased toward the stud ball. Therefore, the wear indicator cannot be manually activated.

Another type of joint includes a wear indicator that requires manual activation since the wear indicator is separate from the bearing. However, wear indicators requiring manual activation typically directly contact the ball stud and therefore produce unwanted interference with the joint assembly.

SUMMARY OF THE INVENTION

The present invention is directed to a joint assembly having a first bearing member contacting a second bearing member, the second bearing member being movable relative to the first bearing member. A wear indicator insert is mounted adjacent to the second bearing member and includes an axial bore therein. A sealing washer is located adjacent to the indicator insert and applies a compression pre-load force to the indicator insert, resulting in a pre-loaded condition. A handle is also connected to the indicator insert bore for allowing grasping by a user.

In addition, the second bearing member further includes a recess having a predetermined depth for receiving at least a portion of the indicator insert. The indicator insert further includes a base having a predetermined thickness that is greater than the depth of the recess to contribute to the pre-loaded condition. The indicator insert is located at least partially in the sealing washer. The handle is preferably a lubrication fitting mounted to the indicator insert.

Further, the indicator insert has a portion with a non-circular cross-section to prevent rotation when the lubrication fitting is assembled with the indicator insert. In one example, the indicator insert portion has a hexagonal cross-section.

In a preferred embodiment of the present invention, the indicator insert has a base section connected to a middle section and a head section and further includes at least one radiused inside corner between the sections for ensuring a tight seal against the sealing washer.

According to the present invention, the wear indicator insert gradually becomes loose as the bearing wears. Upon a certain degree of bearing wear, the indicator insert can inform a user of excessive wear. There are two different methods for determining if excessive wear has occurred in the joint. One method is to grasp a handle on the wear indicator and apply adequate force in an attempt to wiggle the wear indicator insert. The greater the amount of wiggle, the greater the amount of bearing wear. The second method of wear inspection is carried out by pushing on the head of the insert and determining if the head becomes flush with a reference surface, such as the lower surface of sealing washer. Determination can be made visually or by touch.

Further, the present invention avoids interference with the first bearing member and provides a bore for accepting a lubrication fitting to provide lubricant for the joint assembly.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
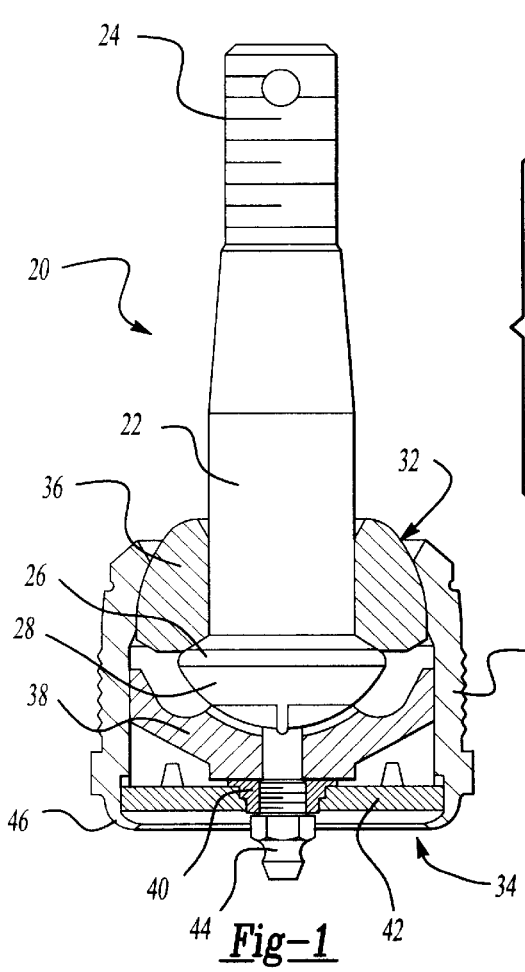
FIG. 1 is an elevational cross-section of a joint assembly according to the present invention.

FIG. 1 shows a joint assembly 20 having a stud 22 with a first threaded end 24 and a second end 26 that includes a ball stud 28. A housing 30 includes upper and lower open ends 32, 34 and receives upper and lower socket bearings 36, 38. Upper socket bearing 36 is spaced vertically away from lower socket bearing 38 by stud ball 28 sandwiched therebetween. A wear indicator insert 40 abuttingly engages lower socket bearing 38 and is retained in place by a sealing washer 42 which seals off and closes lower open end 34 of housing 30. Optionally, but preferably, a lubrication fitting 44 is mounted on indicator insert 40. A lower rim 46 on housing 30 is crimped over sealing washer 42 and provides an axial compression force to the joint assembly to eliminate looseness.

Figure 2:
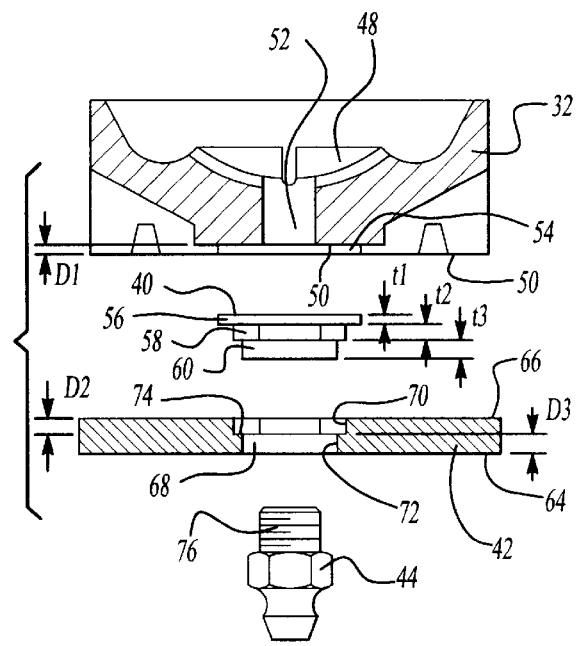
FIG. 2 is an exploded view of a portion of the joint assembly of FIG. 1.

FIG. 2 shows an exploded view of lower socket bearing 38, indicator insert 40, sealing washer 42, and lubrication fitting 44. Lower socket bearing 38 includes an upper surface 48 for engaging stud ball 28 and a lower surface 50 for contacting sealing washer 42. In addition, a central lubrication bore 52 is provided in lower socket bearing 38 to provide lubricant to upper surface 48. A shallow counterbore 54 having a depth D1 is provided on lower surface 50 to receive at least a portion of wear indicator insert 40. Lower socket bearing 38 is preferably made from a polymeric material. However, any suitable material can be used.

Figure 4:
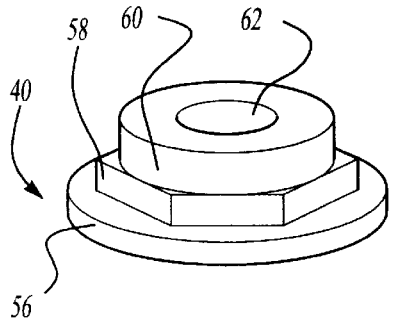
FIG. 4 is a perspective view of an indicator insert according to the present invention.

Next, FIGS. 2 and 4 illustrate wear indicator insert 40 having a generally cylindrical base 56 with a thickness t1 that is greater than depth D1 of counterbore 54, as discussed further below. Further, indicator insert 40 has a middle section 58 with a thickness t2 and a cross-sectional shape that is non-circular to prevent rotation when lubrication fitting 44 is assembled into indicator insert 40. Preferably, the noncircular cross-section is a hexagonal shape to better distribute stresses during assembly with lubrication fitting 44. In addition, indicator insert 40 has a head section 60 that is generally cylindrical with a thickness t3. A central bore 62 extends longitudinally through indicator insert 40 and receives a portion of lubrication fitting 44 and provides a channel for lubricant to flow. Although base 56 and head section 60 have generally cylindrical shapes, any suitable shape is contemplated to be used. Preferably, indicator insert 40 is injection molded using a reinforced polymeric material. However, any suitable fabrication technique and material can be used.

Sealing washer 42 has a first side 64 and a second side 66. In addition, a through bore 68 is defined by a non-circular shaped recess 70 and a cylindrical bore 72. Non-circular recess 70 is sized to receive middle section 58 of indicator insert 40 and has a depth D2 that is approximately equal to thickness t2. Further, cylindrical bore 72 extends from recess 70 toward first side 64. Cylindrical bore 72 is generally smaller than recess 70 creating a shoulder 74 at the transition interface. In addition, bore 72 has a depth D3 that is less than thickness t3 of head section 60 such that a portion of head section 60 protrudes past first side 64 a predetermined distance X. Sealing washer 42 is preferably stamped from sheet metal, however, any suitable fabrication technique and materials can be used.

Lubrication fitting 44 is shown having a threaded end 76 which screws into central bore 62 of wear indicator insert 40. However, there are many different types of lubrication fittings that do not have threaded ends, however, a person of ordinary skill in the art would understand that such lubrication fitting could be readily used in the present invention with only minor modifications.

Figure 3:
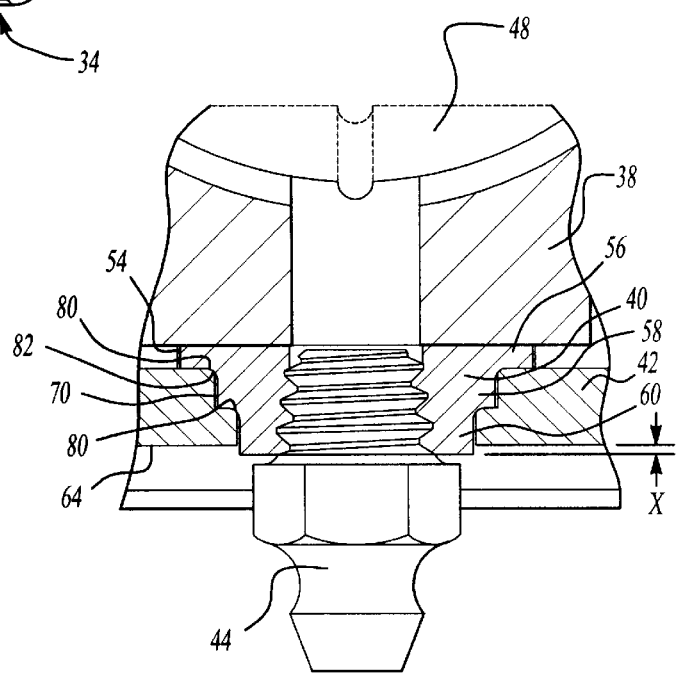
FIG. 3 is an enlarged partial cross-sectional view of a lower portion of the joint assembly of FIG. 1.

FIG. 3 shows an enlarged view of a portion of the present invention in an assembled state. Specifically, wear indicator insert 40 is sandwiched between lower socket bearing 38 and sealing washer 42 in a compression pre-loaded condition. Base 56 of insert 40 is received in counterbore 54 of lower socket bearing 38. However, base thickness t1 is greater than counterbore depth D1 to provide a tight interference pre-load. Middle section 58 of insert 40 is received in complimentary shaped recess 70 of sealing washer 42. Head section 60 protrudes the predetermined distance X from sealing washer first side 64 to indicate that joint assembly 20 has experienced little or no wear. Lubrication fitting 44 is assembled into indicator insert 40 to permit lubricant to be directed to upper surface 48 of lower bearing 38.

Preferably, inside comers 80 on indicator insert 40 are radiused to insure good sealing engagement with outer comers 82 on sealing washer 42. Thus, dirt and debris are kept from entering joint assembly 20 and creating premature bearing wear.

The operation of wear indicator insert 40 will now be described. When joint assembly 20 is newly assembled, indicator insert 40 is in a compression pre-loaded condition and is unable to be moved when an inspector grasps lubrication fitting 44, serving as a handle, to apply forces to indicator insert 40. When a certain degree of bearing wear has taken place in joint assembly 20, the interference pre-load condition is removed. Thus, indicator insert 40 is able to move and will wiggle when an inspector applies force to lubrication fitting 44.

Alternatively, testing for excessive bearing wear can be accomplished by pushing vertically, upwardly on lubrication fitting 44 and inspecting by sight or touch to determine if head section 60 still protrudes past first side 64 of sealing washer 42. If head section 60 does not protrude past sealing washer 42, then an excessive amount of wear has occurred in joint assembly 20 and maintenance should be performed.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A joint assembly comprising:

a first bearing member;

a second bearing member for contacting the first bearing member, said second bearing member being movable relative to said first bearing member;

a wear indicator insert mounted adjacent to said second bearing member and having a bore, wherein said wear indicator is located outside of said bore and said wear indicator does not directly contact said first bearing member, said indicator insert further including a portion having a non-circular cross-section to prevent rotation when a lubrication fitting is assembled with said indicator insert;

a sealing washer located adjacent to said indicator insert and applying a compression pre-load force to said indicator insert, resulting in a pre-loaded condition; and a handle connected to said indicator insert bore, wherein said handle is said lubrication fitting mounted to said indicator insert.

2. The joint assembly of claim 1, wherein said second bearing member further includes a recess having a predetermined depth for receiving at least a portion of said indicator insert.

3. The joint assembly of claim 2, wherein said indicator insert further comprises a base having a predetermined thickness that is greater than said depth of said recess to contribute to said pre-loaded condition.

4. The joint assembly of claim 3, wherein said indicator insert is located at least partially in said sealing washer.

5. The joint assembly of claim 1, wherein said indicator insert portion has a polygonal cross-section.

6. The joint assembly of claim 5, wherein said polygonal cross-section is a hexagon.

7. The joint assembly of claim 1, wherein said indicator insert has a base section connected to a middle section and a head section and further includes at least one radiused inside comer between said sections for ensuring a tight seal against said sealing washer.

8. A ball and socket joint assembly comprising:

a ball stud mounted on one end of a stud member;

a socket bearing having a bore and an upper surface and a lower surface, said upper surface contacting at least a portion of said ball stud;

a housing having first and second open ends for receiving said socket bearing and said ball stud;

a sealing washer having an upper side and a lower side and being located at said first open end for sealingly engaging said housing;

a wear indicator insert located outside of said bore between said bottom surface of said socket bearing and said upper side of said sealing washer and having a bore for allowing lubricant to pass therethrough, wherein said indicator insert further includes a portion having a non-circular cross-section to prevent rotation when a lubrication fitting is assembled with said insert;

said indicator insert being in a compression pre-loaded condition and including a head portion that initially extends beyond said sealing washer and indicates a level of wear in said ball and socket joint assembly; and said lubrication fitting a mounted to said indicator insert, wherein said fitting provides a handle for transferring loads to said insert for checking wear.

9. The joint assembly of claim 8, wherein said socket bearing further includes a recess having a predetermined depth for receiving at least a portion of said indicator insert.

10. The joint assembly of claim 9, wherein said indicator insert further comprises a base having a predetermined thickness that is greater than said depth of said recess to contribute to said pre-loaded condition.

11. The joint assembly of claim 10, wherein said indicator insert is located at least partially in said sealing washer.

12. The joint assembly of claim 8, wherein said indicator insert portion has a polygonal cross-section.

13. The joint assembly of claim 12, wherein said polygonal cross-section is a hexagon.

14. The joint assembly of claim 8, wherein said indicator insert has a base section connected to a middle section and a head section and further includes at least one radiused inside comer between said sections for ensuring a tight seal against said sealing washer.

* * * * *

UNITED STATES PATENT AND TRADEMARK OFFICE
CERTIFICATE OF CORRECTION

| | | |
|---|---|---|
| PATENT NO. | : 6,152,637 | Page 1 of 1 |
| DATED | : November 28, 2000 | |
| INVENTOR(S) | : Garth B. Maughan | |

It is certified that error appears in the above-identified patent and that said Letters Patent is hereby corrected as shown below:

<u>Column 6,</u>
Line 9, replace "comer" with -- corner --.

Signed and Sealed this

Twenty fifth Day of September, 2001

*Attest:*

*Nicholas P. Godici*

*Attesting Officer*

NICHOLAS P. GODICI
*Acting Director of the United States Patent and Trademark Office*